United States Patent

[11] 3,624,101

[72] Inventors Theodore S. Sulkowski
    Wayne;
    Albert A. Mascitti, Norristown, both of Pa.
[21] Appl. No. 18,310
[22] Filed Mar. 10, 1970
[45] Patented Nov. 30, 1971
[73] Assignee American Home Products Corporation
    New York, N.Y.

[54] 2,3-DIHYDRO-5-ARYL-5H-BENZ[F]IMIDAZO[2,1-A]ISOINDOL-5-OLS
6 Claims, No Drawings

[52] U.S. Cl............................................. 260/309.6,
    260/239.9, 260/294.8 A, 260/295 A, 260/295 T,
    260/295 F, 260/296 P, 260/309.7, 260/325,
    260/332.2 A, 260/347.3, 260/517, 424/263,
    424/273
[51] Int. Cl...................................................... C07d 49/34
[50] Field of Search............................................ 260/309.6,
    296 T

[56]             References Cited
            UNITED STATES PATENTS
3,444,181  5/1969  Houlihan.................... 260/309.6

OTHER REFERENCES

Metlesics et al. I J. Org. Chem. Vol. 33, pages 2874– 2877 (1968). QD241.J6

Metlesics et al. II Republic of South Africa Patent Journal Vol. 2, No. 1, pages 90– 91 (1969, Jan. 1969).

Metlesics et al. III Chem. Abst. Vol. 71, No. 61,384r (1969, Sept. 29, 1969) QD1.A51

Sulkowski et al. J. Org. Chem. Vol. 32, pages 2180– 2184 (1967). QD241.J6

Sulkowski I Republic of South Africa Patent Journal Vol. 1, No. 10, page 144 (1968, Oct. 1968).

Sulkowski II Chem. Abst. Vol. 71, No. 3401h (1969, July 7, 1969). QD1.A51

*Primary Examiner*—Natalie Trousof
*Attorneys*—Andrew Kafko and Joseph Martin Weigman ABSTRACT: 2,3-dihydro-5-aryl-5H-benz[f]imidazo[2,i-a]isoindol-5-ols have been prepared which are pharmacologically active as antidepressant.

2,3-DIHYDRO-5-ARYL-5H-BENZ[F]IMIDAZO[2,1-A]ISOINDOL-5-OLS

DESCRIPTION OF THE INVENTION

The new and novel pharmacologically active compounds within the scope of the invention are represented by formula I:

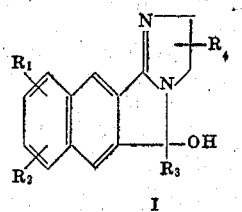

wherein $R_1$ is selected from the group consisting of hydrogen, halogen, amino, (lower)alkylamino, (lower)alkyl and (lower)alkoxy; $R_2$ is hydrogen when $R_1$ and $R_2$ are dissimilar and when $R_1$ and $R_2$ are the same they are both selected from the group consisting of hydrogen, halogen, (lower)alkyl and (lower)alkoxy; $R_3$ is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_4$ is selected from the group consisting of hydrogen, (lower)alkyl and gem di(lower)alkyl; and the pharmaceutically acceptable salts thereof.

The term "(lower)alkyl" is used to described hydrocarbon radicals, straight and branched, of from one to about six carbon atoms, illustrative members of the group being methyl, ethyl, n-propyl, i-propyl, n-butyl, n-hexyl and the like. The terms "halogen" and "halo" are used to describe the group consisting of fluoro, chloro, bromo and iodo. The term "gem" is employed herein to signify that a single carbon atom is disubstituted with the particular substituents. See Hackk's Chemical Dictionary, 3rd Edition, The Blakiston Company, Phila. (1944) p. 373.

The compounds of the invention may be prepared by the following reaction scheme:

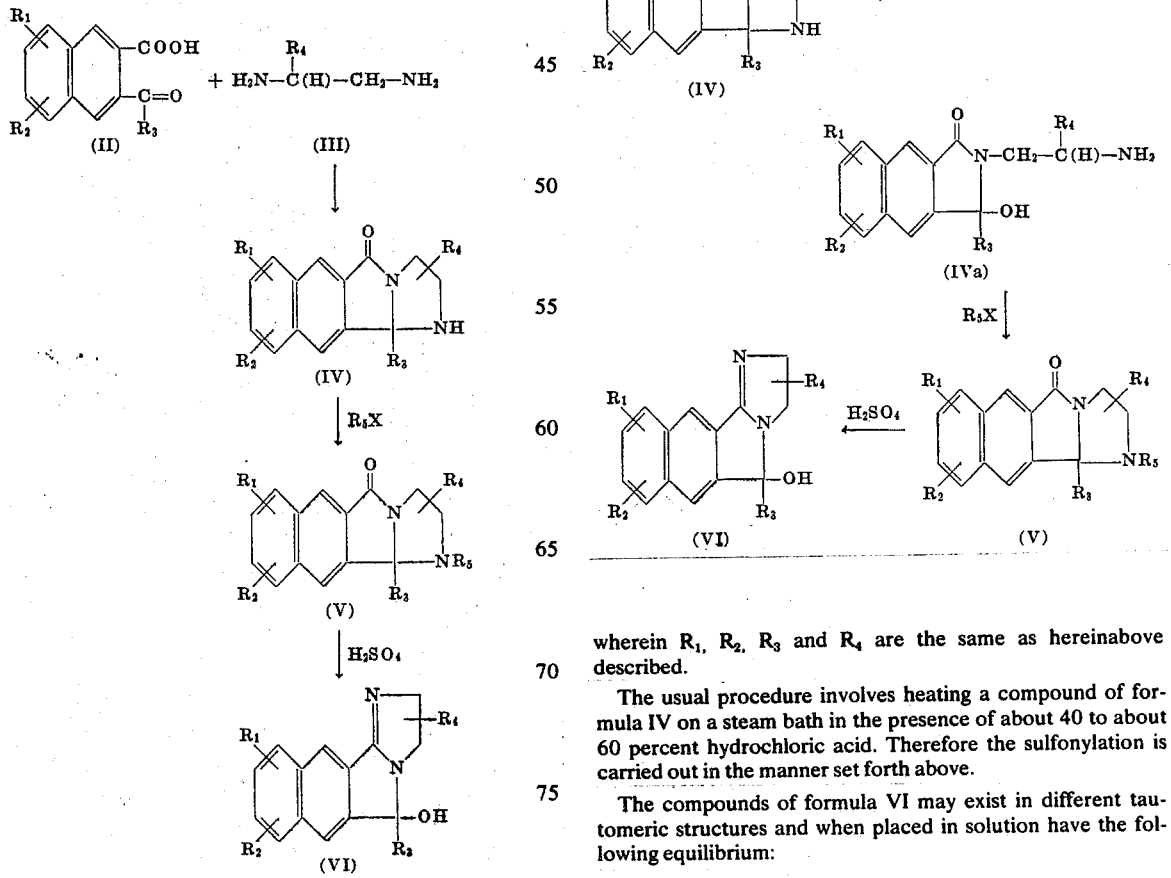

wherein $R_1$, $R_2$, and $R_4$ are the same as hereinabove described; the parenthetical (H) of formula III is employed to indicate that hydrogen is not present when $R_4$ signifies gem di(lower)alkyl; $R_5$ is selected from the group consisting of (lower)alkylsulfonyl, phenylsulfonyl, monohalophenylsulfonyl, dihalophenylsulfonyl, mono(lower)alkylphenylsulfonyl, di(lower)alkylphenylsulfonyl and (lower)alkoxyphenylsulfonyl; X is halogen.

A 3-aroyl-2-naphthoic acid and ethylene diamine or the appropriate ethylene diamine derivative are condensed by refluxing the reactants for from about 2 to about 18 hours. The condensation is preferably carried out in an inert solvent, such as toluene, xylene, benzene, pyridine etc. The reaction mixture is extracted with water and the organic portion is evaporated to dryness. Subsequently the product may be recrystallized from ethanol or ethyl acetate. This intermediate is then sulfonylated with substantially equimolar quantity of an alkyl or aryl sulfonyl halide in pyridine. The reaction is preferably conducted at reflux temperatures for a period of from about 2 to about 18 hours. After the above reaction is complete, the sulfonylated product is recovered by customary isolation procedures.

The above prepared sulfonyltetrahydrobenz[f]imidazoisoindolone may be hydrolyzed and rearranged by admixture with from about 80 to about 100 percent sulfuric acid. The product of the hydrolysis is the sulfate salt of formula VI which may be recovered by conventional means. Alternatively, the reaction mixture is neutralized by the addition of a base and the resulting precipitate recrystallized from an appropriate organic solvent such as a lower alkanol, dioxan, dimethylformamide and dimethylacetamide to afford an appropriate dihydrobenz[f]imidazoisoindol.

The above procedure may be modified by instead of directly sulfonylating the compound of formula IV; the following procedure may be employed:

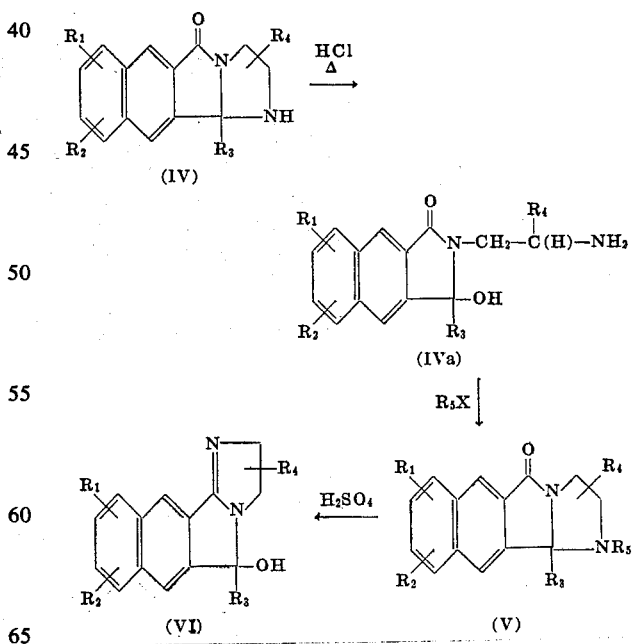

wherein $R_1$, $R_2$, $R_3$ and $R_4$ are the same as hereinabove described.

The usual procedure involves heating a compound of formula IV on a steam bath in the presence of about 40 to about 60 percent hydrochloric acid. Therefore the sulfonylation is carried out in the manner set forth above.

The compounds of formula VI may exist in different tautomeric structures and when placed in solution have the following equilibrium:

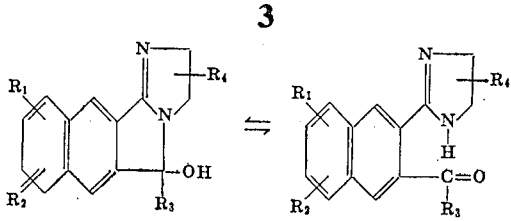

It is understood that all tautomeric forms of the compounds disclosed herein are within the scope of the invention.

The active compounds of the invention react with acids to form salts. All such nontoxic pharmaceutically acceptable acid addition salts are within the scope of the invention. Suitable acids for the formation of acid addition salts include hydrochloric, hydrobromic, sulfuric, nitric, phosphoric, acetic, lactic, citric, tartaric, maleic, gluconic, benzenesulfonic, toluenesulfonic, methylsulfonic, ethylsulfonic, and the like.

The compounds of formula I are pharmacologically active as antidepressant agents when administered orally to mammals.

The compounds have been orally administered to a group of six mice (three males and three females). One hour later the animals are challenged with reserpine, 2.5 mg./kg. administered intraperitoneally. The degree of ptosis for each eye was determined at 1 and 2 hours post treatment. Prevention of resperpine ptosis is an indication of antidepressant activity. See Rubin et al. J.P.E.T. 120, 125 (1957). Controls are simultaneously run with amphetamine and Tofranil. The compounds of formula I were found to be active in mice at a dose of about 0.15 to about 10 mg./kg. of body weight when administered orally.

The compounds have been tested for anorexiant activity according to the following procedure:

Male Charles River rats between 120 and 140 grams are trained to drink sweetened condensed milk from a graduated drinking tube. After a short learning period the animals are placed on a routine of water ad lib for 24 hours, standard laboratory chow for 22 hours and sweetened condensed milk for 2 hours. The volume of milk consumed is measured at 30 minutes as well as 2 hours. The animals are weighed every day. This schedule is maintained 5 days a week over a period of several months. Drug trials are run on Thursdays and changes in milk consumed and 24 hour weight changes are compared to the average of the two days before drug administration. Animals are tested as groups of six and one group is given saline each week to serve as controls. Drugs are usually administered intraperitoneally in saline or orally in water.

The compounds of the invention did not inhibit appetite when treated at dosage levels of up to 10 mg./kg. of body weight, P.O.

In naming the compounds wherein $R_4$ is other than hydrogen the alternate nomenclature has been employed. This is because the tautomerism of the —NH—C N— moiety does not permit any absolute prediction as to the positioning of the (lower)alkyl or gem di(lower)alkyl substituent. When the steric influence of the substituent group is considered the probability is great that the product is a 2-(lower)alkyl or 2,2-di(lower)alkyl compound. As the available evidence does not conclusively eliminate the possibility of a 3-(lower)alkyl or a 3,3-di(lower)alkyl compound, the alternative nomenclature has been employed herein.

The following examples are added to illustrate but not to limit the scope of the invention:

EXAMPLE I

A solution of 9 g. of 3-(p-chlorobenzoyl)-2-naphthoic acid, 25 ml. of ethylenediamine, and 150 ml. of toluene are refluxed in a flask equipped with a water separator. After refluxing 18 hours, the mixture is extracted with water. The organic portion is evaporated to dryness. The residue is recrystallized from ethanol to obtain 11b-(p-chlorophenyl)-1,2,3,11b-tetrahydro-5H-benz[f]imidazo[2,1-a]isoindol-5-one, m.p. 217°–9α⅔ c.

Anal. Calcd for $C_{20}H_{15}ClN_2O$: C, 71.75; H, 4.56; N, 8.37; Cl. 10.91.

Found: C, 71.76; H, 4.47; N,8.03; Cl. 10.5.

EXAMPLE II

In a manner analogous to example I, 3-benzoyl-2-naphthoic acid is reacted with ethylenediamine to obtain 1,2,3,11b-tetrahydro-11H -phenyl-5H-benz[f ]imidazo[2,1-a]2,1-a]isoindol-5-one, m.p. 232°–4° C. (Rx EtOH).

Anal. Calcd for $C_{20}H_{16}N_2O$: C, 79.98; H, 5.37; N, 9.33.

Found: C, 79.91; H,5.31; N, 9.27.

EXAMPLE III

In a manner analogous to example I, 3-benzoyl-2–naphthoic acid is reacted with 1,2-diaminopropane to obtain 1,2,3,11b-tetrahydro2-methyl-11b-phenyl- 5H-benz[F]imidazo-[2,1-a]isoindol-5-one, m.p. 180°–5° C. (Rx EtoH).

Anal. Calcd for $C_{21}H_{18}N_2O$: C, 80.23; H5.77; N, 8.91.

Found: C, 80.47; H, 5.83; N, 8.86.

EXAMPLE IV

In a manner analogous to example I, 3-(3,4-dichlorophenyl)-2-naphthoic acid is reacted with ethylenediamine to obtain 11b(3,4-dichlorobenzoyl)1,2,3,11b-tetrahydro-5H-benz[f]-imidazo[2,1-a]isoindol-5-one, m.p. 215°–7° C. (Rx EtOH).

Anal. Calcd for $C_{20}H_{14}N_2Cl_2O$: C, 65.05; H, 3.82; N, 7.58; Cl, 19.21.

Found: C, 65.31; H, 3.66; N, 7.54; CL,18.89.

EXAMPLE V

In a manner analogous to example I, 3-benzoyl-2-naphthoic acid is reacted with 1,2-diamino-2-methylpropane to obtain 2,2-dimethyl-1,2,3,11b-tetrahydro-11b -phenyl-5H-benz[f]-imidazo[2,1-a]isoindol-5-one, m.p. 203°–5° C. (Rx EtOH).

Anal. Calcd for $C_{22}H_{20}N_2O$: C, 80.45; H, 6.14; N, 8.53.

Found: C, 80.45; H, 6.21; N,8.56.

EXAMPLE VI

A solution of 30 g. of 11b-(p-chlorophenyl)-1,2,311b-tetrahydro-5H-benz[f]imidazo[2,1-a]isoindol-5-one, 23 g. of p-toluensulfonyl chloride and 100 ml. of pyridine is refluxed for 17 hours. The solution is evaporated to dryness in vacuo. The residue is slurried with ethanol and the solid is separated by filtration. On recrystallization from ethanol there is obtained 11b-(p-chlorophenyl)-1,2,3,11b-tetrahydro-1(p-tolylsulfonyl)-5H- benz[f]imidazo[2,1-a]isoindol-5-one, m.p. 176°–9 C.

Anal. Calcd for $C_{27}H_{21}ClN_2SO_3$: C, 66.31; H, 4.33; N, 5.73.

Found: C, 66.28; H, 4.41; N, 5.84.

EXAMPLE VII

In a manner analogous to example VI, 1,2,3,11b-tetrahydro-11b-phenyl-5H-benz[f]imidazo[2,1-a]isoindol-5-one is reacted with p-toluenesulfonyl chloride to obtain 1,2,3,11b-tetrahydro-11b-phenyl-1-(tolylsulfonyl)-5H-benz[f]imidazo-[2,1-a]isoindol-5-one, m.p. 206°–8° C. (Rx EtOH).

Anal. Calcd for $C_{27}H_{22}N_2SO_3$: C, 71.36; H, 4.87; N, 6.16; S, 7.05.

Found: C, 71.17; H, 4.71; N, 6.36; S, 7.36.

EXAMPLE VIII

In a manner analogous to example VI, 11b-(3,4-dichlorophenyl)-1,2,311b-tetrahydro-5H-benz[f]imidazo[2,1-a]isoindol-5-one is reacted with p-toluenesulfonyl chloride to obtain 11b (3,4-dichlorophenyl)-1,2,3,11b-tetrahydro-1-(p- tolylsulfonyl)-5H-benz[f]imidazo[2,1-a]isoindol-5-one, m.p. softens 144°–7° C., melts at 190° C. (Rx EtOH).

Anal. Calcd for $C_{27}H_{20}N_2Cl_2SO_3$: C, 61.95; H, 3.85; N, 5.36; Cl, 13.55.

Found: C, 62.23; H, 3.74; N, 5.34; 5.34; Cl, 13.42.

EXAMPLE IX

In a manner analogous to example VI, 1,2,3,11b-tetrahydro-2-methyl-11b-phenyl-5H-benz[f]imidazo[2,1-a]isoindol-5-one is reacted with p-toluenesulfonyl chloride to obtain 1,2,3,11b-tetrahydro-2-methyl-11b-phenyl-1-tolylsulfonyl)-5H-benz[f]imidazo[2,1-a]isoindol-5-one, m.p. 215°–7° C. (Rx EtOH).

Anal. Calcd for $C_{28}H_{24}N_2SO_3$: C, 71.77; H, 5.17; N, 5.98.
Found: C, 71.80; H, 4.94; N, 6.08.

Example X

A mixture of 30 g. of 2,2-dimethyl-1,2,3,11b-phenyl-5H-benz[f]imidazo[2,1-a]isoindol-5-one and 150 ml. of 50 percent hydrochloric acid is heated in a steam bath for 10 minutes. Clear solution forms then solid reprecipitates. The mixture is heated for an additional 15 minutes then is cooled and filtered to obtain 2-(2-amino-2-methylpropyl)-3-hydroxy-3-phenyl-1H-benz[f]isoindol-1-one hydrochloride, m.p. 280° C. (dec.)

The hydrochloride is converted to the base by treatment with sodium carbonate solution. Recrystallization from ethyl acetate affords the base, m.p. 179°–181° C.

Anal. Calcd for $C_{22}H_{22}N_2O_2$: C, 76.27; H, 6.40; N, 8.09.
Found: C, 76.38; H, 6.44; N, 8.00.

2-(2-amino-2-methylpropyl)-3-hydroxy-3-phenyl-1H-benz[f]isoindol-1-one (20 g.) from above 13 g. of p-toluenesulfonyl chloride and 200 ml. of pyridine are refluxed for 8 hours, the solution is evaporated to dryness. The residue is slurried with water and filtered. Recrystallization from ethanol affords 2,2-dimethyl-1,2,3,11b-tetrahydro-11b-phenyl1-(p-tolysulfonyl)-5H-benz[f]imidazo[-a]isoindol-5-one, m.p. 240°–2° C.

Anal. Calcd for $C_{29}H_{26}N_2SO_3$: C, 72.17; H, 5.43; N, 5.80.
Found: C, 72.18; H, 5.24; N, 5.83.

EXAMPLE XI

A solution of 25 g. of 11b-(p-chlorophenyl)-1,2,3,11b-tetrahydro-1-(p-tolylsulfonyl)-5H-benz[f]imidazo[2,1-a]isoindol-5-one and 100 ml. of 95 percent sulfuric acid is allowed to stand at room temperature for 45 minutes. The mixture is quenched with several volumes of ice water then neutralized with concentrated sodium hydroxide solution. The solid is separated and washed with water. On recrystallization from dimethylacetamide there is obtained 5-(p-chlorophenyl)-2,3-dihydro-5H-benz[f]imidazo-[2,1-a]isoindol-5-ol, m.p. 224°–6 C.

Anal. Calcd for $C_{20}H_{15}N_2Cl0$: C, 71.74; H, 4.51; N, 8.37; Cl, 10.59.
Found: C, 71.91; H, 4.88; N, 8.60; Cl, 10.60.

EXAMPLE XII

A solution of 69 g. of 1,2,3,11b-tetrahydro-11b-phenyl-1-(p-tolylsulfonyl)-5H-benz[f]imidazo[2,1-a]isoindol-5-one and 200 ml. of 90 percent sulfuric acid is allowed to stand at room temperature for 45 minutes. The mixture is quenched with several volumes of ice water. The diluted solution is washed with ethylacetate. The aqueous portion is made basic with concentrated sodium hydroxide solution. The solid is separated and washed with water. On recrystallization from dimethylacetamide there is obtained 2,3-dihydro-5-phenyl-5 H-benz[f]imidazo[2,1-a]isoindol-5-ol, m.p. 202°–5° C.

Anal. Calcd for $C_{20}H_{16}N_2O$: C, 79.98; H, 5.37; N, 9.32.
Found: C, 79.69; H, 5.12; N, 9.37.

The hydrochloride is prepared by treating its base with hydrogenchloride m.p. 209°–211° C.

Anal. Calcd for $C_{20}H_{17}N_2Cl0$: C, 71.32; H, 5.08; N, 8.32; Cl, 10.53.
Found: C, 71.11; H, 5.26; N, 8.40; Cl, 10.78.

EXAMPLE XIII

A solution of 23.5 g. of 1,2,3,11b-tetrahydro-2-methyl-11b-phenyl-1-(p-tolylsulfonyl)-5H-benz[f]imidazo[2,1-a]isoindol-5-one and 75 ml. of 90 percent sulfuric acid is allowed to stand at room temperature for 45 minutes. The mixture is diluted with ice water and extracted with ethyl acetate. The aqueous portion is neutralized with concentrated sodium hydroxide solution and extracted with ethylacetate. The organic solution is evaporated to dryness. The residue is recrystallized from ethanol to obtain 2,3-dihydro-2 (or 3)methyl-5-phenyl-5H-benz[f]imidazo[2,1-a]isoindol-5-ol, m.p. 196°–8° C.

Anal. Calcd for $C_{21}H_{18}N_2O$: C, 80.23; H, 5.77; N, 8.91.
Found: C, 80.52; H, 5.68; N, 8.89.

EXAMPLE IV

A solution of 10 g. of 11b-(3,4-dichlorophenyl)-1,2,3,11b-tetrahydro-1-(p-tolylsulfonyl)-5H-benz[f]imidazo[2,1-a]isoindol-5-one and 50 ml. of 90 percent sulfuric acid is allowed to stand at room temperature for one-half hour. The mixture is diluted with ice water and neutralized with concentrated sodium hydroxide solution. The solid is separated by filtration. On recrystallization from dilute dimethylacetamide there is obtained 5-(3,4-dichlorophenyl)-2,3-dihydro-5H-benz[f]-imidazo[2,1-a]isoindol-5-ol, m.p. 215°–7° C.

Anal. Calcd for $C_{20}H_{14}N_2OCl_2$: C, 65.05; H, 3.82; N, 7.59.
Found: C, 65.31; H, 3.99; N, 7.71.

EXAMPLE XV

A solution of 20 g. of 2,2- dimethyl-1,2,3,11b-tetrahydro-11b-phenyl-1-(p-tolylsulfonyl)-5H-benz[f]imidazo[2,1-a]isoindol-5-one and 50 ml. of 90 percent sulfuric acid is allowed to stand at room temperature for 45 minutes. The mixture is diluted with ice water and extracted with ethylacetate. T aqueous portion is neutralized with concentrated sodium hydroxide solution. The solid is separated and washed with water. On recrystallization from aqueous ethanol there is obtained 2,3-dihydro-2,2(or 3,3)diemthyl-5phenyl-5H-benz[f]imidazo[2,1-a]isoindol-5-ol, m.p.197°–9° C.

Anal. Calcd for $C_{22}H_{20}N_2O$: C, 80.46; H, 6.14; N, 8.53.
Found: C, 80.46; H, 6.14; N, 8.71.

EXAMPLE XVI

By procedures analogous to those above the following reactions are employed to make corresponding intermediates and compounds:

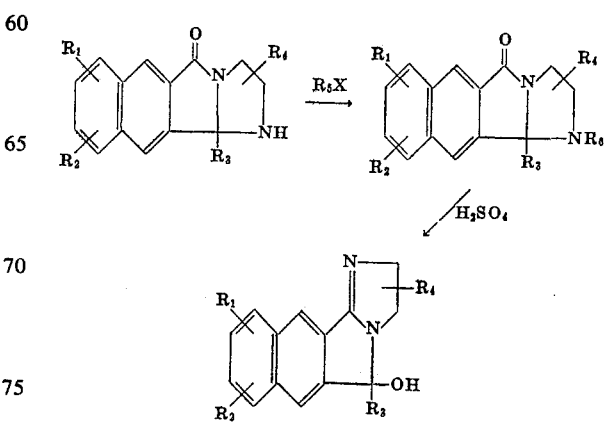

wherein $R_1$, $R_2$, $R_3$, $R_4$, $R_5$ and X are as follows:

| $R_1$ | $R_2$ | $R_3$ | $R_4$ | $R_5$ | X |
|---|---|---|---|---|---|
| 8-bromo | Hydrogen | p-Iodophenyl | Methyl | p-Tolylsulfonyl | Chloro. |
| 9-methoxy | do | 3,4-dimethylphenyl | do | Methylsulfonyl | Iodo. |
| 8-chloro | 9-chloro | p-Methoxyphenyl | Hydrogen | Ethylsulfonyl | Chloro. |
| 8-methylamino | Hydrogen | 4-trifluoromethylphenyl | Ethyl | p-Methoxyphenylsulfonyl | Do. |
| 8-methyl | 9-methyl | 2,5-dibromophenyl | Hydrogen | p-Chlorophenylsulfonyl | Bromo. |
| 7-ethoxy | Hydrogen | 3,4-dimethoxyphenyl | Methyl | 3,4-dichlorophenylsulfonyl | Chloro. |
| 8-methoxy | 9-methoxy | 2-thienyl | n-Butyl | 3,5-dimethylphenylsulfonyl | Do. |
| 10-iodo | Hydrogen | p-Propoxyphenyl | Methyl | Propylsulfonyl | Do. |
| 8-fluoro | 9-fluoro | 2-pyridyl | n-Butyl | p-Tolylsulfonyl | Do. |
| Hydrogen | Hydrogen | 2,5-dipropoxyphenyl | Hydrogen | Phenylsulfonyl | Do. |
| 8-ethyl | do | 2-furyl | do | p-Ethylphenylsulfonyl | Do. |
| 9-propylamino | do | 3,4-diethylphenyl | Methyl | p-Tolylsulfonyl | Do. |
| 8-ethyl | 10-ethyl | Tetrahydro-2-naphthyl | Hydrogen | 3,5-dibromophenylsulfonyl | Do. |
| Hydrogen | Hydrogen | o-Chlorophenyl | Methyl | o-Chlorophenylsulfonyl | Do. |
| 9-ethyl | do | Phenyl | do | p-Tolylsulfonyl | Do. |
| Hydrogen | do | 2,5-dibutylphenyl | Hydrogen | do | Do. |
| Do | do | Phenyl | Ethyl | do | Do. |
| 8-ethoxy | do | p-Chlorophenyl | i-Propyl | 4-ethoxyphenylsulfonyl | Do. |
| Hydrogen | do | m-Chlorophenyl | Hydrogen | 4-propylphenyl | Do. |
| 8-n-propyl | 9-n-propyl | 4-fluorophenyl | Ethyl | p-Tolylsulfonyl | Do. |
| 8-amino | Hydrogen | 3,4-dichlorophenyl | Methyl | do | Do. |
| 8-butyl | do | 4-ethoxyphenyl | Ethyl | do | Do. |
| 8-bromo | 9-bromo | 4-bromophenyl | i-Propyl | do | Do. |
| Hydrogen | Hydrogen | 4-chlorophenyl | 2,2-diethyl | do | Do. |
| 8-chloro | do | Phenyl | 2,2-di-n-propyl | do | Bromo. |

EXAMPLE XVII

By procedures analogous to those employed in example X, the following intermediates are prepared:

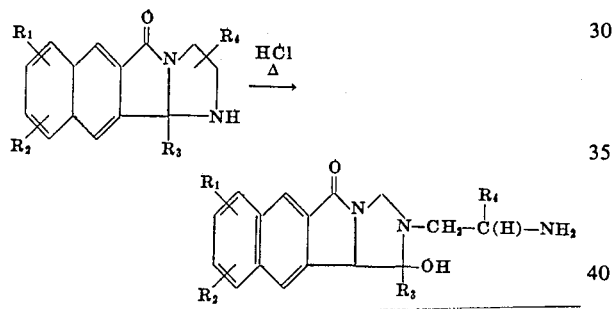

wherein $R_1$, $R_2$, $R_3$, $R_4$ and (H) are the same as hereinabove defined.

| $R_1$ | $R_2$ | $R_3$ | $R_4$ |
|---|---|---|---|
| 8-bromo | hydrogen | p-iodophenyl | methyl |
| 9-methoxy | hydrogen | 3,4-dimethylphenyl | methyl |
| 8-chloro | 9-chloro | p-methoxyphenyl | hydrogen |
| 8-methylamino | hydrogen | 4-trifluoromethylphenyl | ethyl |
| 8-methyl | 9-methyl | 2,5-dibromophenyl | hydrogen |
| 7-ethoxy | hydrogen | 3,4-dimethoxyphenyl | methyl |
| 8-methoxy | 9-methoxy | 2-thienyl | n-butyl |
| 10-iodo | hydrogen | p-propoxyphenyl | methyl |
| 8-fluoro | 9-fluoro | 2-pyridyl | n-butyl |
| hydrogen | hydrogen | 2,5-dipropoxyphenyl | hydrogen |
| 8-ethyl | hydrogen | 2-furyl | hydrogen |
| 9-propylamino | hydrogen | 3,4-diethylphenyl | methyl |
| 8-ethyl | 10-ethyl | tetrahydro-2-naphthyl | hydrogen |
| hydrogen | hydrogen | o-chlorophenyl | methyl |
| 9-ethyl | hydrogen | phenyl | methyl |
| hydrogen | hydrogen | 2,5-dibutylphenyl | hydrogen |
| hydrogen | hydrogen | phenyl | ethyl |
| 8-ethoxy | hydrogen | p-chlorophenyl | propyl |
| hydrogen | hydrogen | m-chlorophenyl | hydrogen |
| 8-n-propyl | 9-n-propyl | 4-fluorophenyl | ethyl |
| 8-amino | hydrogen | 3,4-dichlorophenyl | methyl |
| 8-n-butyl | hydrogen | 4-ethoxyphenyl | ethyl |
| 8-bromo | 9-bromo | 4-bromophenyl | n-propyl |
| hydrogen | hydrogen | 4chlorophenyl | 2,2-diethyl |
| 8-chloro | hydrogen | phenyl | 2.2-di-n-propyl |

We claim:
1. A compound selected from the group consisting of:

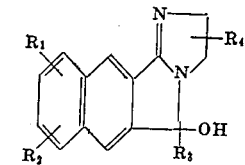

wherein $R_1$ is selected from the group consisting of hydrogen, halogen, amino, (lower)alkylamino, (lower)alkyl and (lower)alkoxy; $R_1$ is hydrogen when $R_1$ and $R_2$ are dissimilar and when $R_1$ and $R_2$ are the same they are both selected from the group consisting of hydrogen, halogen, (lower)alkyl and (lower)alkoxy; $R_3$ is selected from the group consisting of phenyl monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_4$ is selected from the group consisting of hydrogen, (lower)alkyl and gem di(lower)alkyl; and the pharmaceutically acceptable salts thereof.

2. A compound as defined in claim 1 which is: 5-(p-chlorophenyl)-2,3-dihydro-5H-benz[f]imidazo[2,1-a]isoindol-5-ol.

3. A compound as defined in claim 1 which is: 2,3-dihydro-5-phenyl-5H-benz[f]imidazo[2,1-a]isoindol-5-ol.

4. A compound as defined in claim 1 which is: 2,3-dihydro-2(or 3)-methyl-5-phenyl-5H-benz[f]imidazo[2,1-a]-isoindol-5-ol.

5. A compound as defined in claim 1 which is: 5-(3,4-dichlorophenyl)-2,3-dihydro-5H-benz[f]imidazo[2,1-a]-isoindol-5-ol.

6. A compound as defined in claim 1 which is: 2,3-dihydro-2,2(or 3,3)-dimethyl-5-phenyl-5H-benz[f]imidazo-[2,1-a]isoindol-5-ol.

* * * * *